(12) United States Patent
Seth

(10) Patent No.: US 12,488,562 B2
(45) Date of Patent: Dec. 2, 2025

(54) SYSTEMS AND METHODS FOR FRACTAL-BASED VISUAL SEARCHING

(71) Applicant: Accenture Global Solutions Limited, Dublin (IE)

(72) Inventor: Amiteshwar Dayal Seth, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 755 days.

(21) Appl. No.: 17/536,400

(22) Filed: Nov. 29, 2021

(65) Prior Publication Data
US 2022/0172455 A1 Jun. 2, 2022

Related U.S. Application Data

(60) Provisional application No. 63/120,135, filed on Dec. 1, 2020.

(51) Int. Cl.
*G06V 10/74* (2022.01)
*G06F 16/532* (2019.01)
(Continued)

(52) U.S. Cl.
CPC .......... *G06V 10/761* (2022.01); *G06F 16/532* (2019.01); *G06N 20/00* (2019.01);
(Continued)

(58) Field of Classification Search
CPC ...... G06V 10/761; G06V 10/42; G06V 10/44; G06V 10/7715; G06V 10/82;
(Continued)

(56) References Cited

U.S. PATENT DOCUMENTS

| | | | | |
|---|---|---|---|---|
| 5,347,600 A | * | 9/1994 | Barnsley | H04N 19/99 382/233 |
| 6,567,563 B2 | * | 5/2003 | Shin | H04N 1/0005 382/249 |

(Continued)

FOREIGN PATENT DOCUMENTS

WO WO-2017168125 A1 10/2017

OTHER PUBLICATIONS

Fan, L. et al. "Distribution Structure Learning Loss (DSLL) Based on Deep Metric Learning for Image Retrieval," Entrophy 2019, vol. 21(11); doi:10.3390/e21111121; 22 pages.

(Continued)

*Primary Examiner* — Jennifer Mehmood
*Assistant Examiner* — Pardis Sohraby
(74) *Attorney, Agent, or Firm* — Seed Intellectual Property Law Group LLP

(57) ABSTRACT

The present disclosure provides a visual search engine (VSE) configured to perform visual searches. The VSE may receive a query image for searching through a plurality of images stored in a dataset. Different ones of the images stored in the dataset may be indexed or logically grouped together based on a fractal transform that associates images depicting similar content with each other. A fractal transform of the query image may be used to identify a plurality of images from the dataset to be searched based on the query image. A modified image triplet technique using the query image, a derived set of similar images, and a derived set of dissimilar images may be utilized to identify features of the images being searched. Search results logic of the VSE may apply deep learning techniques to the feature sets to identify a set of search results to return for the query image.

16 Claims, 7 Drawing Sheets

(51) Int. Cl.
*G06N 20/00* (2019.01)
*G06V 10/42* (2022.01)
*G06V 10/44* (2022.01)
*G06V 10/77* (2022.01)
*G06V 10/82* (2022.01)

(52) U.S. Cl.
CPC .............. *G06V 10/42* (2022.01); *G06V 10/44* (2022.01); *G06V 10/7715* (2022.01); *G06V 10/82* (2022.01)

(58) Field of Classification Search
CPC ........ G06F 16/532; G06F 16/55; G06F 16/56; G06N 20/00; G06N 3/045; G06N 3/08
USPC ......................................................... 382/156
See application file for complete search history.

(56) References Cited

U.S. PATENT DOCUMENTS

| | | | | |
|---|---|---|---|---|
| 9,053,115 | B1* | 6/2015 | Rosenberg | G06F 16/583 |
| 9,290,010 | B2* | 3/2016 | Hanina | H04N 19/99 |
| 10,157,441 | B2* | 12/2018 | Chang | G06T 1/20 |
| 11,216,506 | B1* | 1/2022 | Ranzinger | G06F 16/56 |
| 2013/0088555 | A1* | 4/2013 | Hanina | B41J 3/407 |
| | | | | 347/107 |
| 2014/0195560 | A1* | 7/2014 | Xin | G06F 16/583 |
| | | | | 707/772 |
| 2014/0307958 | A1* | 10/2014 | Wang | G06F 18/214 |
| | | | | 382/159 |
| 2018/0181822 | A1* | 6/2018 | Chang | G06V 10/50 |
| 2020/0034455 | A1 | 1/2020 | Chandra Sekar Rao et al. | |
| 2020/0042838 | A1* | 2/2020 | Trim | G06V 30/1916 |
| 2021/0303910 | A1* | 9/2021 | Powell | G06V 10/40 |

OTHER PUBLICATIONS

Wang, J. et al. "Learning Fine-grained Image Similarity with Deep Ranking," 2014 IEEE Conference on Computer Vision and Pattern Recognition, Apr. 2014, pp. 1386-1393, 8 pages.

Zhang, L. et al. "New Method of Image Retrieval Using Fractal Code on the Compression Domain," WSEAS Transactions on Systems, 2008, vol. 7 (12), pp. 1484-1493, 10 pages.

European Patent Office, Communication, Extended European Search Report issued for Patent Application No. 21211612.3, dated Apr. 26, 2022, 11 pages.

* cited by examiner

SYSTEMS AND METHODS FOR FRACTAL-BASED VISUAL SEARCHING

CROSS-REFERENCE TO RELATED APPLICATIONS

The present application claims the benefit of priority from U.S. Provisional Application No. 63/120,135 filed Dec. 1, 2020 and entitled "SYSTEMS AND METHODS FOR FRACTAL-BASED VISUAL SEARCHING," the disclosure of which is incorporated by reference herein in its entirety.

TECHNICAL FIELD

The present application relates to visual searching techniques and more specifically to techniques for leveraging fractals and deep learning to perform visual searches for finding "similar" images.

BACKGROUND

Visual searching techniques involve techniques that utilize images as inputs to queries to search for content. For example, a visual search may be used to find additional images of content depicted in an image selected as the input to the query. Several visual searching tools exist and leverage a variety of techniques to perform visual searches. For example, existing visual search tools may include image similarity models, deep learning techniques, Siamese networks, and image triplets. While these existing techniques are all capable of performing visual searches, each of these different techniques have limitations on accuracy (e.g., histogram of oriented gradients (HOG), scale invariant feature transform (SIFT), Siamese Network, descriptor vector based deep learning models) or the amount of computing power required (e.g., for current deep learning techniques used for identifying similar images) that limits their viability to be used at scale for solving various real-world problems, such as identifying motherboards with missing components in semiconductor industry or making recommendations to users via an online retail portal. Another disadvantage of existing visual searching techniques is that while they may work to some degree for use cases where exact matches are of interest, they do not function well for use cases where similar but different search results are desired (i.e., finding search results that are similar to the source or query image but differ in some way from the source or query image).

SUMMARY

The present application discloses systems, methods, and computer-readable storage media for providing visual searching functionality that leverages fractals and deep learning techniques to provide visual search functionality. In aspects, images stored in a filesystem may be associated into groups or indexed such that images depicting similar subject matter or content may be in the same group. In an aspect, fractals may be used to associate the images with different groups. To illustrate, fractal transforms may be applied to each stored image and the outcome of the fractal transform may be used to classify the images into different groups. The fractal transforms may result in images depicting similar subject matter being grouped together due to properties of fractals. The unique or at least semi-unique properties provided by fractal transforms enable images depicting similar subject matter to be logically grouped, classified, or indexed.

As will be described in more detail below, the use of fractal-based classification and storage of images may be used to limit a search space (e.g., an immediate search space) over which visual searches are conducted and increase the speed with which visual searches may be conducted by embodiments of the present disclosure.

Visual searches according to embodiments may be performed using a deep learning engine that utilizes a combination of deep and shallow networks. The different layers and functionality provided by the layers of the deep and shallow networks are described in more detail below. Processes used for training the deep learning engine(s) and then subsequently using the trained deep learning engine(s) to search images that have been grouped, classified, or indexed using fractals are also described. During training of the deep learning engine(s), query images (e.g., a picture of an item of clothing, an object, etc.) are passed through a visual search engine. In an aspect, the visual search engines of embodiments may leverage fractal transforms to select the images over which the search is to be conducted from the dataset. For example, a fractal transform may be applied to the query image and the result of the fractal transform may be used to select a set of images from the dataset to be searched. Utilizing fractal transforms to identify the immediate search space (e.g., the set of images to be searched) may reduce the number of images that need to be searched since only images depicting similar subject matter (e.g., due to the use of fractal transforms) may be included in the search space, thereby allowing the search to be performed with fewer computational resources and be completed more quickly (e.g., since images depicting subject matter substantially different from query image will not be included in the immediate search space or searched).

Once the search space is identified, the visual search engines of embodiments may utilize a modified image triplet technique to generate feature sets for the images included in the search space. The image triplet technique of embodiments may include a first image (the query image), a first derived set of images, and a second derived set of images, where the first set of derived images may include images from within the search space, and the second derived set of images may include of a mix of images, predominantly from outside the immediate search space. The search results identified for the search based on the search space may be further refined by applying a clustering algorithm to identify a set of images from within the search space that satisfy the search based on the query image.

During training, the query image, the first derived set of images, and the second derived set of images may each be provided to a kernel configured to apply deep learning techniques (i.e., the deep and shallow network) to their respective inputs datasets (e.g., one of the query image, the first derived set of images, or the second derived set of images). The deep learning techniques utilized by the kernels may include a deep convolutional neural network (deep network) and a shallow convolutional neural network (shallow network). The deep network may be configured to identify high level features or details of the input image(s) and the shallow network may be configured to identify low level features or details of the input image(s). The outputs of deep and shallow networks may be used to generate a feature vector that includes information identifying features of the subject matter depicted in the images.

The feature vectors generated by passing the images through the kernels may be fed into a Hinge loss function which further segregates the positive and negative images and generates a final feature set. During training, the image, its fractal map, and the generated feature set may all be stored. The training process may be repeated for all images in the training dataset, resulting in a set of searchable images that have been indexed according to the generated fractal maps and each image included in the set of searchable images may be associated with a feature set.

Once training of the kernel(s) is complete, the system can be used to perform visual searches to identify images similar to a query image. For example, an image may be provided to the system as an input through application programming interface (API) call, a direct program input through files or User Interface (UI) based query tools, or other techniques. To facilitate the search, the query image may undergo a fractal transformation and the generated fractal map may be used to select a search space (e.g., based on the fractal maps generated during the training and that are used to store the set of searchable images). The input image may be passed through the kernel to generate a feature vector for the query image and the query image feature vector may then be compared to the stored feature vectors of images from the search space to identify images that should be returned as search results. In an aspect, the feature vector of the query image may be compared to the stored feature vectors of the images within the search space using an implementation of a K-nearest neighbors (KNN) algorithm to identify a list of similar images (i.e., the search results). In an aspect, the KNN algorithm may be used to rank the list of similar images or the search results, such as based on a degree of closeness to the query image determined by the KNN algorithm.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of the present disclosure provide systems, methods, and computer-readable storage media for performing visual searches using a combination of fractal transform and deep learning techniques. Visual searches according to embodiments of the present disclosure may be performed on images stored in a dataset, where the images may be logically associated with each other or organized into groups based on fractal transforms. Using fractals to organize images in the dataset may enable searches to be completed more quickly since it may allow searches to be performed on a subset or portion of the images stored in the dataset rather than on the entire library of images. For example, a fractal transform may be applied to a query image and the output of the fractal transform may be used to identify the images to include in the search space (e.g., the subset or portion of the images stored in the dataset that are to be searched).

Once the search space is identified, a modified image triplet technique and various deep learning processes may be utilized to generate a set of search results to return to the user. The modified image triplet technique may utilize three sets of images: a first set of images that includes the query image, a second set of images that includes images similar to the query image, and a third set of images that includes images that are dissimilar to the query image. The second set of images may be referred to as a first derived set of images and may be determined using an implementation of KNN algorithm. The third set of images may be referred to as a second derived set of images and may be determined using fractal sampling. Kernels configured to utilize deep learning techniques may be used to analyze the first, second, and third sets of images to produce a set of embeddings that includes features obtained from each of the sets of images. The deep learning techniques may include utilizing deep and shallow convolutional neural networks to extract features from the query image and each image included in the first and second derived sets of images. The features may be analyzed by search results logic configured to apply a deep learning process, such as a hinge loss function, to the embeddings to identify the search results (e.g., images) that should be returned to the user based on the received query image.

Figure 1:
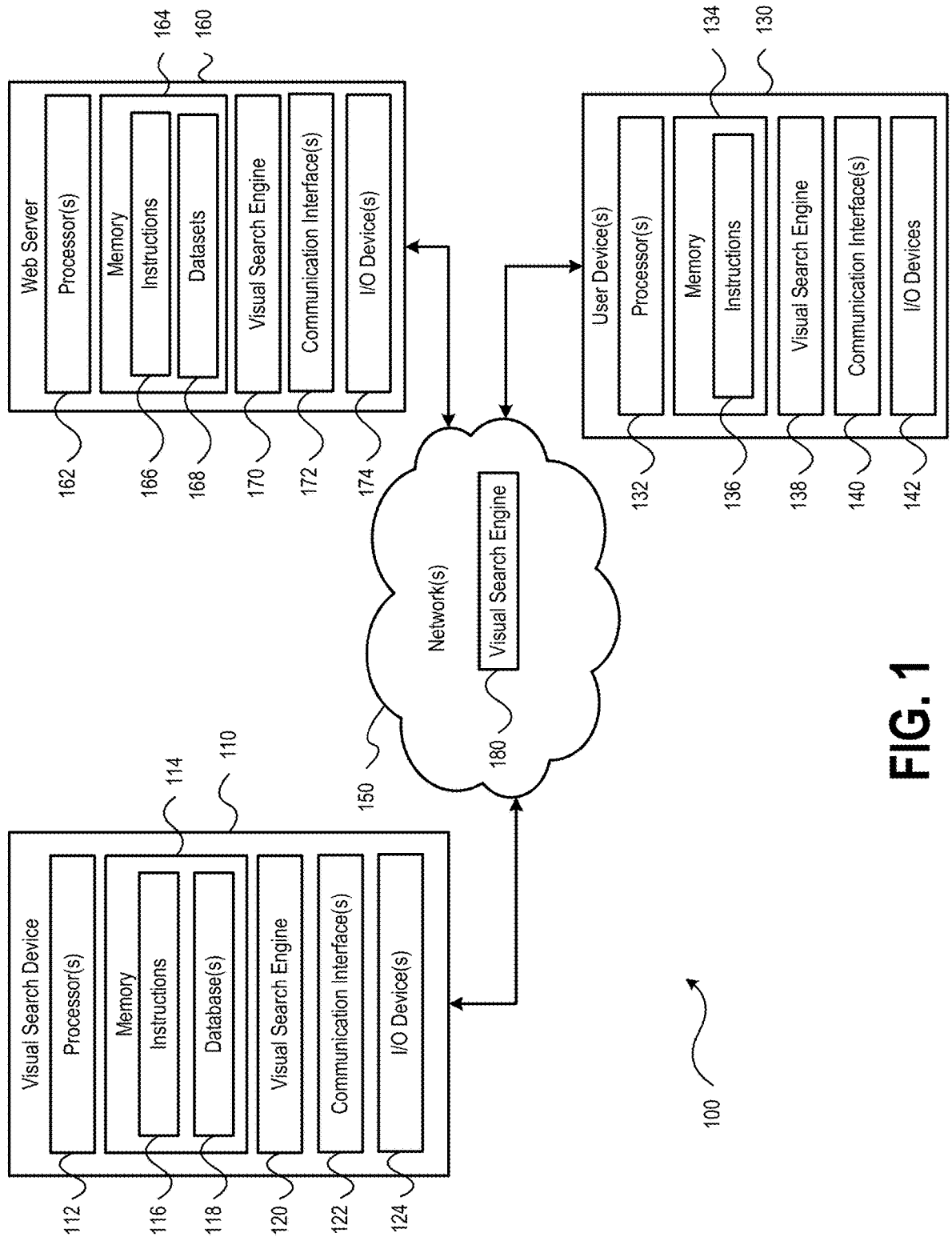
FIG. 1 is a block diagram illustrating a system for providing visual searching functionality in accordance with embodiments of the present disclosure.

Referring to FIG. 1, a block diagram illustrating a system for providing visual searching functionality in accordance with embodiments of the present disclosure is shown as a system 100. As shown in FIG. 1, the system 100 may include a visual search device 110, one or more user devices 130, and a web server 160. The visual search device 110, the one or more user devices 130, and the web server 160 may be communicatively coupled via one or more networks 150, which may include local area networks (LANs), wide area networks (WANs), wireless WANs, wireless LANs (WLANs), metropolitan area networks (MANs), wireless MAN networks, cellular data networks, cellular voice networks, the Internet, other types of public and private networks, or a combination of different network types and topologies.

The visual search device 110 may be configured to provide fractal-based visual search functionality to the one or more user devices 130, the web server 160, or both. As illustrated in FIG. 1, the visual search device 110 may include one or more processors 112, a memory 114, a visual search engine 120, one or more communication interfaces 122, and one or more I/O devices 124. The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the visual search device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the visual search device 110 may be stored in the memory 114 as instructions 116 that, when executed by the one or more processors 112, cause the one or more processors 112 to perform the operations described herein with respect to the visual search device 110, as described in more detail below. Additionally, the memory 114 or filesystem may be configured to store one or more datasets 118. Exemplary aspects of the one or more datasets 118 are described in more detail below.

The visual search engine 120 may be configured to provide functionality for performing fractal-based visual searching in accordance with aspects of the present disclosure. The functionality provided by the visual search engine 120 may be implemented as hardware (e.g., CPUs, GPUs, ASICs, FPGAs, etc.) or a combination of hardware and software (e.g., the instructions 116 executable by the one or more processors 112). Exemplary aspects of the functionality provided by the visual search engine 120 are described in more detail below.

The one or more communication interfaces 122 may be configured to communicatively couple the visual search device 110 to external devices and systems via one or more networks 150, such as the one or more user devices 130 and the web server 160. Communication between the visual search device 110 and the external devices and systems via the one or more networks 150 may be facilitated via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). The one or more input/output (I/O) devices 124 may include one or more display devices, a keyboard, a stylus, one or more touchscreens, a mouse, a trackpad, a camera, one or more speakers, haptic feedback devices, or other types of devices that enable a user to receive information from or provide information to the visual search device 110, such as information provided or input by a system administrator or other user.

The one or more user devices 130 may include one or more processors 132, a memory 134, one or more communication interfaces 140, and one or more I/O devices 142. The one or more processors 132 may include one or more microcontrollers, ASICs, FPGAs, CPUs and/or GPUs having one or more processing cores, or other circuitry and logic configured to facilitate the operations of the user device(s) 130 in accordance with aspects of the present disclosure. The memory 134 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the user device(s) 130 may be stored in the memory 134 as instructions 136 that, when executed by the one or more processors 132, cause the one or more processors 132 to perform the operations described herein with respect to the user device(s) 130, as described in more detail below.

The one or more communication interfaces 140 may be configured to communicatively couple the user device(s) 130 to external devices and systems via one or more networks 150, such as the visual search device 110 and the web server 160. Communication between the user device(s) 130 and the external devices and systems via the one or more networks 150 may be facilitated via wired or wireless communication links established according to one or more communication protocols or standards (e.g., an Ethernet protocol, a TCP/IP, an IEEE 802.11 protocol, an IEEE 802.16 protocol, a 3G communication standard, a 4G/LTE communication standard, a 5G communication standard, and the like). The I/O devices 142 may include one or more display devices, a keyboard, a stylus, one or more touchscreens, a mouse, a trackpad, a camera, one or more speakers, haptic feedback devices, or other types of devices that enable a user to receive information from or provide information to external devices, such as the visual search device 110 or the web server 160.

The web server 160 may include one or more processors 162, a memory 164, one or more communication interfaces 172, and one or more I/O devices 174. The one or more processors 162 may include one or more microcontrollers, ASICs, FPGAs, CPUs and/or GPUs having one or more processing cores, or other circuitry and logic configured to facilitate the operations of the web server 160 in accordance with aspects of the present disclosure. The memory 164 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the web server 160 may be stored in the memory 164 as instructions 166 that, when executed by the one or more processors 162, cause the one or more processors 162 to perform the operations described herein with respect to the web server 160, as described in more detail below. Additionally, the memory 164 may be configured to store one or more datasets 168. Exemplary aspects of the one or more datasets 168 are described in more detail below.

The one or more communication interfaces 172 may be configured to communicatively couple the web server 160 to external devices and systems via one or more networks 150, such as the visual search device 110 and the user device(s) 130. Communication between the web server 160 and the external devices and systems via the one or more networks 150 may be facilitated via wired or wireless communication links established according to one or more communication protocols or standards (e.g., an Ethernet protocol, a TCP/IP, an IEEE 802.11 protocol, an IEEE 802.16 protocol, a 3G communication standard, a 4G/LTE communication standard, a 5G communication standard, and the like). The I/O devices 174 may include one or more display devices, a keyboard, a stylus, one or more touchscreens, a mouse, a trackpad, a camera, one or more speakers, haptic feedback devices, or other types of devices that enable a user to receive information from or provide information to external devices, such as information provided by a systems administrator or other user.

It is noted that while FIG. 1 illustrates a single visual search device 110, embodiments of systems providing visual search functionality in accordance with the present disclosure may include more than one visual search device 110. In some aspects, the functionality provided by the visual search device 110 may be provided via the cloud, as illustrated by visual search engine 180. Visual search engine 180 may be provided by hardware and software resources (e.g., processors, software, etc.) disposed in a cloud configuration and that are accessible via the one or more networks 150. When deployed in the cloud via the visual search engine 180, the visual search functionality may be accessible to external devices and systems, such as the one or more user devices 130 and the web server 160, via the one or more networks 150. In additional aspects, the visual search functionality provided by the visual search device 110 may be provided local to the one or more user devices 130, such as via a visual search engine 138, or local to the web server 160, such as via visual search engine 170. The functionality described herein with respect to the visual search engine 120 may be provided by the visual search engine 138 or the visual search engine 170.

It is also noted that visual search functionality may be provided by different ones of the visual search engines 120, 138, 170, 180. To illustrate, while FIG. 1 illustrates a single web server 160, systems according to the present disclosure may be configured to support a plurality of web servers. Each of the web servers may be configured to provide media content (e.g., images, video, etc.) to the user device(s) 130 and a user of the user device may initiate one or more visual searches using different ones of the visual search engines 120, 138, 170, 180. For example, a first user device may initiate a first visual search via a web page provided by a first web server, a second user device may initiate a second visual search via a web page provided by a second web server, a third user device may initiate a third visual search via a web page provided by a third web server, and a fourth user device may initiate a fourth visual search via a fourth web server. The first visual search may be performed using the visual search engine 120, the second visual search may be performed using the visual search engine 138, the third visual search may be performed using the visual search engine 170, and the fourth visual search may be performed using the visual search engine 180. The different searches may be performed by different visual search engines based on the configuration of the visual search system. For example, providing visual search functionality locally at the web server (e.g., via the visual server engine 170) may be appropriate for web pages or websites experiencing a high volume of visual search requests, but web pages websites experiencing a lower volume of visual search requests may be configured to utilize the visual search engine 120 or the visual search engine 180 (e.g., to reduce the costs or complexities associated with implementing the functionality locally at the web server). In still other implementations where content upon which the visual search is performed is stored local to a user device it may be beneficial to utilize a visual search engine local to the user device, such as the visual search engine 138. It is noted that the above-described configurations for using local or external visual search engines have been provided for purposes of illustration, rather than by way of limitation and that systems providing visual search engine functionality in accordance with the present disclosure may be configured to utilize any configuration of local and/or external visual search engines depending on the particular use cases to which the disclosed visual search functionality is applied.

The visual search functionality provided by the visual search engine 120 (or one of the visual search engines 138, 170, 180) may be provided to the users in a variety of use cases. In an exemplary use case, the web server 160 may provide an e-commerce website and a user may be viewing items on the website via a web browser application of the user device 130. The items displayed on the website may include media content (e.g., images of the items offered for sale, videos demonstrating aspects of the items offered for sale, etc.) and the user may select one or more of the displayed items (e.g., via clicking an interactive graphical user interface element of the website, such as a check box, a radio button, a button). Once the item(s) is selected, the user may activate search functionality (e.g., via clicking on a search button or other interactive graphical user interface element of the website). In response to activation of the search function of the website, the media content associated with the selected item(s) may be transmitted to the visual search device 110. For example, an image of the selected item(s) may be transmitted to the visual search device 110. In an aspect, the image may be transmitted to the visual search device from the web server 160. To illustrate, the web server 160 may detect activation of the search interactive graphical user interface element at the user device 130 and determine an item of media content to transmit to the visual search device. The media content may be retrieved from the one or more datasets 168, which may correspond to a dataset maintaining media content associated with the items offered for sale via the website. It is noted that the description above describes the media content as being transmitted to the visual search device 110 from the web server 160 for purposes of illustration rather than by way of limitation, and it should be understood that media content may also be transmitted to the visual search device 110 by the user device 130 or information identifying the media content (e.g., an image name or identifier) may be transmitted to the visual search device 110 and then the visual search device 110 may retrieve the identified media content from a dataset (e.g., the one or more datasets 118, the one or more datasets 168, or another dataset).

Upon receiving the media content, the visual search device 110 may provide the media content to the visual search engine 120 as an input, and the visual search engine 120 may be configured to perform a visual search based on the input media content. For example, the media content selected by the user may be a source image and the source image may be used to query a dataset (e.g., the dataset 118, the dataset 168, or another dataset) to obtain a set of zero or more search results, where the search results may be other images sharing similarities with the source image. In some aspects, the media content may be retrieved from a dataset instead of being transmitted to the visual search device 110. To illustrate, an identifier or other information may be provided to the visual search device 110 and the visual search device 110 may use the provided identifier or other information to obtain the search image. Once received, the visual search device 110 may initialize the visual search engine 120 to perform the search, such as by providing the source image or original image to the visual search engine 120 as an input.

The visual search engine 120 may be configured to perform various processing operations to perform the visual search. For example, the source image may be subjected to a fractal transform in order to identify a relevant portion of the media content stored in the dataset, where the relevant portion of the media content corresponds to media content that should be searched based on the source image. In an aspect, the fractal transform may be performed using a partitioned iterative function system (PIFS). To generate the fractal transform, the image(s) may be partitioned into n×n non-overlapping regions (e.g., square regions) and a linear transform of the gray levels of the pixels may be generated. The gray level transformation itself may be based on brightness and contrast of the transformed block and may produce a fractal map. In an aspect, the fractal maps may be compared using multilevel search keys. The index for the image derived from generation of the fractal map may be stored as a hash, along with the corresponding original image filename. Storing this information may allow the search engines of embodiments to rapidly identify an immediate search space of images to be searched when a query image is received. Moreover, once relevant images from the immediate search space are identified, the images stored in association with the index may be returned to users as search results, as described in more detail below.

Upon receiving the source image, the visual search engine may perform a fractal transform on the source image, as described above. The fractal transform may then be used to identify a portion of the dataset to be visually searched. The portion of the dataset to be visually searched may form a search set or an immediate search space over which the visual search based on the source image may be carried out.

Having identified the relevant search set, the visual search engine 120 may utilize the input image and pass it through a kernel to generate a feature set for the input image. This feature set may then be compared against retrieved feature sets of the images included in the search set using a KNN algorithm. By limiting the immediate search space based on the fractal maps or indexes derived from fractal maps and using the KNN algorithm to identify the relevant images within the search space, the search time may be reduced and the visual search process may be performed much faster and in a less resource intensive manner. Exemplary aspects of the above-described processes are illustrated and described in more detail below.

Figure 2:
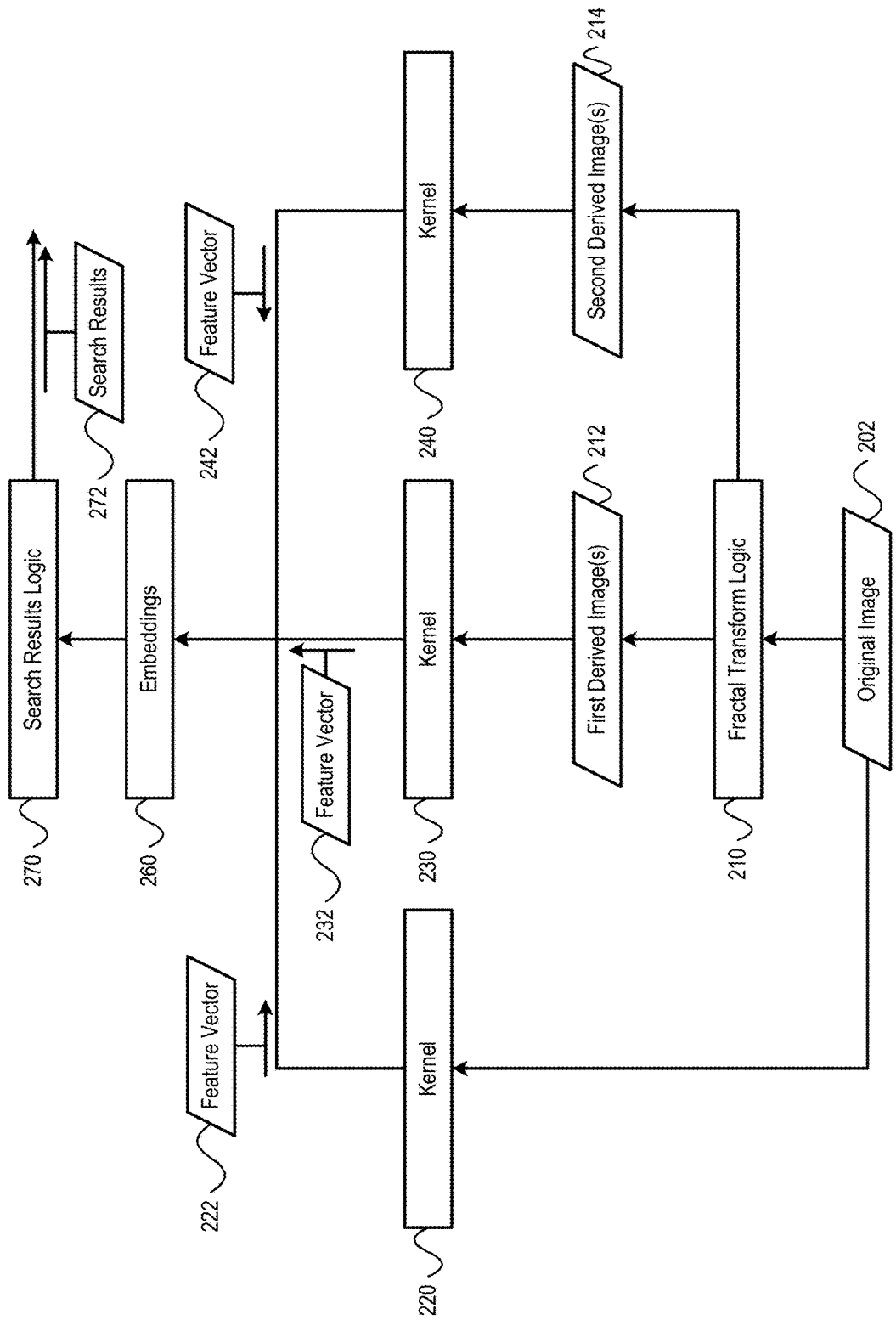
FIG. 2 is a block diagram illustrating exemplary aspects of performing a visual search using a visual search engine in accordance with aspects of the present disclosure.

For example, FIG. 2 is a block diagram illustrating exemplary aspects of training a visual search engine in accordance with aspects of the present disclosure. As shown in FIG. 2, visual search engines of embodiments may include fractal transform logic 210, a plurality of kernels 220, 230, 240. It is noted that FIG. 2 illustrates a plurality of kernels for purposes of illustration, rather than by way of limitation and the visual search engines in accordance with the concepts disclosed herein may be implemented with fewer kernels (e.g., 1 kernel). To illustrate, the kernels 220, 230, 240 may be utilized for training the deep learning algorithms used to perform visual searching and one or more trained kernels may be used to perform live searches for users. As described above, the visual search engine may receive an original image 202, such as an image selected by a user as described above with reference to FIG. 1. The original image 202 may be received by the fractal transform logic 210 and a fractal transform may be applied to the original image 202. The fractal map generated from the original image 202 may then be used to determine an image search space. In an aspect, the image search space or immediate search space may include all images within a standard deviation of the original image 202. In an aspect, the search space may be limited to a threshold number of images, such as a maximum of 500 images. It is noted that the threshold number of images may be larger than 500 images or less than 500 images depending on the particular implementation of the visual search engine.

The final search results may be determined by comparing the feature set generated for the input image with the feature sets of the images within the immediate search space, which was identified using the above-described fractal-based indexing technique. In an aspect, the feature set of the source image and the features sets of the images within the immediate search space may be compared using deep learning or a K-nearest neighbor (KNN) algorithm. The KNN algorithm may be configured to compute distances between features of the source and indexed images obtained from the dataset to identify a cluster of images from among the obtained images. In an aspect, the KNN algorithm may be customized to utilize priority queues and may store only the current closest neighbors (e.g., in each priority queue). The cluster of images may be determined based on whether the features of the images are close to the features of the original image 202 or not, where closeness may be determined based on the determined distances.

As described above with reference to FIG. 1, the visual search engines of embodiments may utilize a modified image triplicate technique based on the original image 202, the first set of derived images 212 and the second set of derived images 214. During training the original image 202 may be provided to the kernel 220, a first derived image 212 may be provided to the kernel 230, and a second set of derived images 214 may be provided to the kernel 240. In an aspect, a closed standard deviation may be used to select the first image 212 from the search space and the second set of derived images 214 may be selected based on images between ±one and two standard deviations and with a maximum image count of 500. Each of the kernels may be configured to apply deep learning engines to the respective input image to generate a feature vector. For example, the kernel 220 may be configured to generate a feature vector 222 based on the original image 202, the kernel 230 may be configured to generate a feature vector 232 based on the first derived image 212, and the kernel 240 may be configured to generate a feature vector 242 based on the second set of derived images 214. Exemplary aspects of applying deep learning techniques (e.g., deep learning techniques) to derive the feature vectors 222, 232, 242 are described in more detail below with reference to FIG. 3. The feature vectors 222, 232, 242 may then be fed into a hinge loss function to arrive at the final feature set for the original image 202.

During training, the final feature set produced for the original image may then be stored in associated with the fractal map (or index, such as a hash of the fractal map) and the original image 202. Each image included in the dataset may then undergo this process such that a fractal map or index is generated for each image in the dataset and the fractal map or index of each image is stored in associated with the corresponding image and feature set derived for the images. During a live search, one or more kernels may be used to generate a feature set for the query image and then the search space may be identified (e.g., based on identification of images within the dataset having an index or fractal map similar to the fractal map of the query image) and then the feature set for the query image may be compared to the features sets stored in association with the index or fractal map of the images within the search space to identify the search results. It is noted that the feature set for a query image used in a live search may be generated using a single kernel, such as the kernel 220, or may be generated using more than one kernel if desired. However, using a single kernel may reduce the computational requirements of the search.

In an aspect, the number of search results returned in response to a visual search may be configurable. For example, suppose that the immediate search space included 300 images, and that there were a total of 150 images that satisfied the threshold similarity. The search results logic 270 may be configurable to include all 150 images in the search results 272 or to include less than all 150 images (e.g., 5 images, 10 images, 15 images, 20 images, 25 images, etc.) in the search results 272 depending on the particular number of search results configured for the system. In an aspect, the number of search results presented to the user may be configured by an entity operating the web server 160 of FIG. 1, such as a system administrator responsible for maintaining a website provided by the web server 160. In an additional or alternative aspect, the number of search results that are presented at the user device 130 may be configured by the user. In still additional or alternative aspects, the number of search results returned by the search results logic 270 may be configured by an entity associated with the visual search device 110 of FIG. 1.

In some aspects, the rules of the search results logic 270 may also be configured to require at least some of the search results 272 to be selected from the images associated with the second set of derived images 214 to ensure that at least some of the search results 272 are dissimilar (e.g., have some differences) with respect to the original image 202. Such capabilities may be particularly suited to certain use cases where differences between the original image 202 and the search results presented to the user are not only tolerable, but may in fact be desired. For example, suppose the original image 202 depicts a motherboard (or another type of circuit board) having certain features (e.g., memory slots, integrated sound card, network interface slot, and so on). The search results may include images depicting motherboards that include the same number of memory slots but a different configuration for some other portion of the motherboard (e.g., integrated audio rather than a slot for installing a sound card). In such instances, the ability to provide similar but different search results may be beneficial since there may be insufficient quantities of matching parts or components on hand for a given task or job but the dissimilar search results may show that sufficient quantities of suitable parts are available. Additionally, it is noted that previous visual search tools were not designed to provide or consider dissimilar search results—instead, such tools were focused on returning images that closely matched the source image.

As described and illustrated in FIG. 2, visual search engines of embodiments may be configured to leverage a combination of fractal and deep learning techniques to perform visual searches and generate a set of search results based on a source image. In addition to being capable of providing both search results based on both similar and dissimilar images, the visual search engines of the present disclosure reduce the computational resources and processing time associated with performing visual searches. For example, utilizing fractal transforms to identify portions of the images stored in the dataset(s) upon which the search should be conducted may speed up the image triplicate process utilized by the disclosed visual search engines by 70% for the first derived images and 40% for the second derived images as compared to previous visual search tools that utilized conventional image triplicate processes based on positive and negative images. As described in more detail below, the deep learning techniques utilized by the kernels 220, 230, 240 may increase search accuracy to over 90%. Additionally, visual search engines according to the present disclosure may be operated with at least 60% lower resource requirements, searches to be completed 50% faster, and generally provide a 7% accuracy improvement as compared to previous visual search tools. Thus, the disclosed visual search engines improve the functioning of computer systems providing visual search functionality as compared to conventional visual search tools and technologies.

Figure 5:
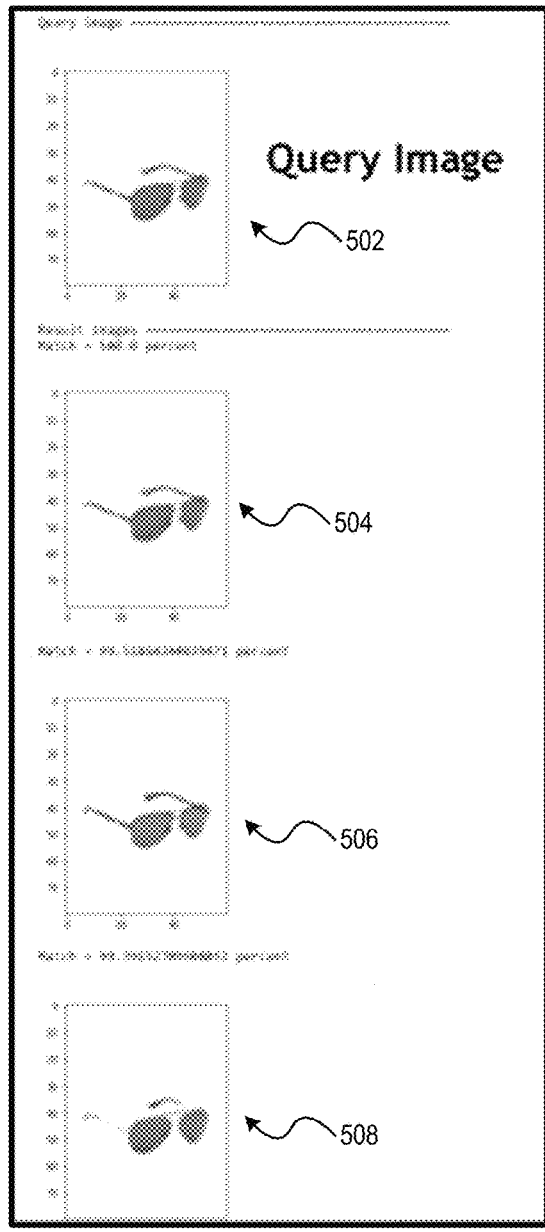
FIG. 5 shows images illustrating search results obtained using visual search techniques in accordance with aspects of the present disclosure.

Referring back to FIG. 1, upon determining the set of search results (e.g., the search results 272 of FIG. 2), the visual search engine 120 may provide the search results to the user device 130 for presentation to the user. For example, as described above, the user may initiate the visual search from a web browser application displaying an e-commerce website and the user may have selected an image depicting a product that the user is interested in purchasing. The search results may include additional products that are similar to, but not necessarily identical to the product depicted in the selected image. To illustrate and referring to FIG. 5, images illustrating search results obtained using visual search techniques in accordance with aspects of the present disclosure are shown. In FIG. 5, a query image 502 is shown. The query image may correspond to an image designated by a user to be used for conducting the search, such as via selection from a graphical user interface of an e-commerce website as described above with reference to FIG. 1. In FIG. 5, search results obtained from conducting a search based on the query image 502 are shown as search result images 504, 506, 508. As can be seen in FIG. 5, the query performed based on the query image 502 produced search results that include search results that include the identical image (e.g., search result image 504 corresponds to the query image 502), as well as similar search result images (e.g., search result images 506 and 508). The similar search result images 506, 508, while differing from the query image 502 in some aspects, share similar features to the query image 502. For example, the sunglasses depicted in search result images 506, 508 have the same frame style as the sunglasses depicted in the query image 502, but have different lens colors and/or frame characteristics (e.g., the frame of the sunglasses in search result image 506 has the same thickness as the sunglasses shown in the query image 502 but a different color, while the frame of the sunglasses in search result image 508 is thinner than the frame of the sunglasses shown in the query image 502 and is a different color). The search result images 504, 506, 508 demonstrate that the visual search techniques described herein enable visual searches to be performed to accurately find exact matches (e.g., search result 504) to the query image 502, as well as search results that are similar but have some differences with respect to the query image 502 (e.g., the search result images 506, 508).

Figure 6:
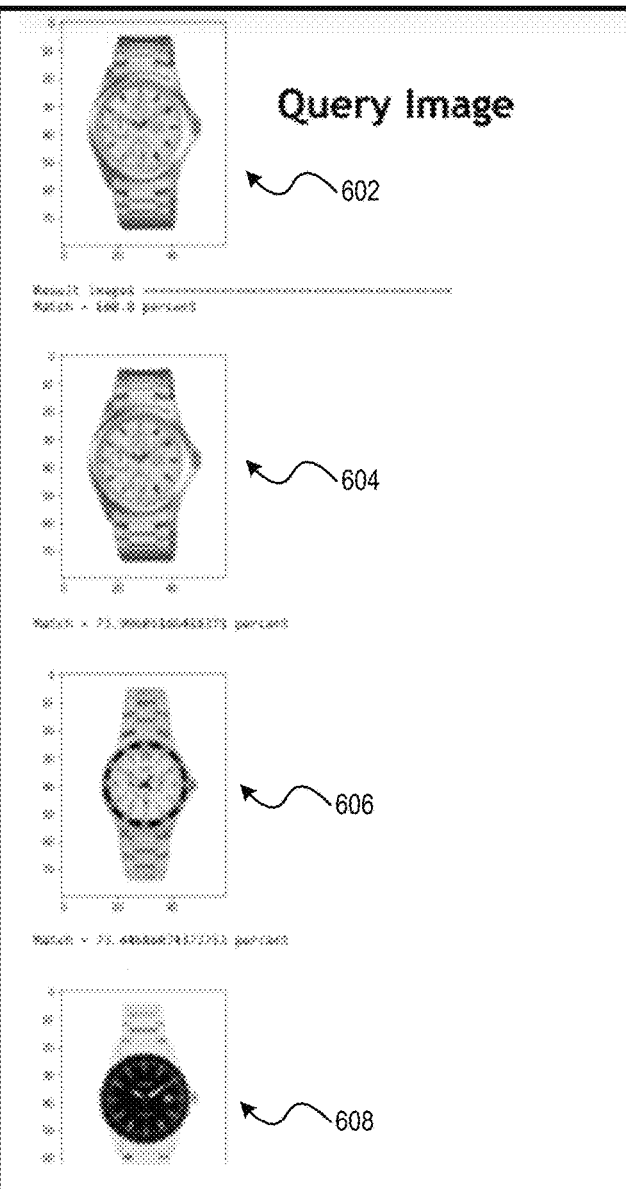
FIG. 6 shows images illustrating search results obtained using visual search techniques in accordance with aspects of the present disclosure.

Referring to FIG. 6, images illustrating search results obtained using visual search techniques in accordance with aspects of the present disclosure are shown. In FIG. 6, a query image 602 is shown. The query image may correspond to an image designated by a user to be used for conducting the search, such as via selection from a graphical user interface of an e-commerce web site as described above with reference to FIG. 1. In FIG. 6, search results obtained from conducting a search based on the query image 602 are shown as search result images 604, 606, 608. As can be seen in FIG. 6, the query performed based on the query image 602 produced search results that include search results that include the identical image (e.g., search result image 604 corresponds to the query image 602), as well as similar search result images (e.g., search result images 606 and 608). The similar search result images 606, 608, while differing from the query image 602 in some aspects, share similar features to the query image 602. For example, the watch depicted in search result images 606, 608 have the same band style as the watch depicted in the query image 602, but have some different characteristics (e.g., the bezel of the watch in search result image 606 has black on the outer edge while the watch shown in the query image 602 does not, and the face of the watch shown in search result image 608 is black while the face of the watch shown in the query image 602 is white). The search result images 604, 606, 608 demonstrate that the visual search techniques described herein enable visual searches to be performed to accurately find exact matches (e.g., search result 604) to the query image 602, as well as search results that are similar but have some differences with respect to the query image 602 (e.g., the search result images 606, 608).

The ability to identify exact matches and similar but not exact matches via a visual search conducted in accordance with aspects of the present disclosure represents an improvement to visual search technologies and techniques. For example, as explained above, existing visual search tools are focused on finding exact matches, but are not particularly well suited to identify search results that are not identical to the query image, such as the search result images 506, 508 of FIG. 5 or the search result images 606, 608 of FIG. 6. In addition to improving the capabilities of visual searches to identify similar but not exact match-type search results, the visual searching techniques described herein also provide improved performance, accuracy, and efficiency as compared to previous visual search tools. To illustrate, the deep and shallow networks utilized by the visual searching techniques of embodiments may provide greater than 90% accuracy (e.g., a higher level accuracy than some of the techniques discussed in the background) at least in part based on the ability to capture both high and low level details, which overcomes one of the primary drawbacks of Siamese network-based visual searching tools. The use of fractal-based indexing enables the visual search techniques described herein overcome many of the drawbacks associated with previous image-triplet visual search tools, such as reducing the immediate search space over which the visual searches are performed.

Referring back to FIG. 1, when the search results are displayed to the user, the user may then browse through the results and potentially select an image corresponding to the product the user is interested in. As shown above with reference to FIGS. 5 and 6, the visual searches conducted according to embodiments may identify exact matches (e.g., search result 504 of FIG. 5 and search result 604 of FIG. 6) as well as non-exact matches that are closely similar to the source image (e.g., the query images 502, 602 of FIGS. 5 and 6, respectively). It is noted that while some of the exemplary use cases described so far relate to a user selecting an image (e.g., the query image) from an ecommerce website, embodiments are not limited to such scenarios. Indeed, the visual search engine 120 may be configured to receive an image as a search query from a search engine (e.g., GOOGLE®). To illustrate, the search engine may provide a graphical user interface that enables the user to browse through images stored on the user device 130 to select the query image, access a camera capability of the user device 130 to capture an image that is to be used as the query image, or other types of functionality that enable the user to specify the query image. Regardless of the use case to which the visual search engines of embodiments are applied or the particular mechanisms by which visual searches are initialized, the visual search techniques described herein enable accurate search results to be obtained more quickly and with a higher level of accuracy than previous visual search tools. Additionally, the disclosed visual search engines are able to conduct visual searches with lower computational resource requirements, which enables the visual search device 110 to be operated more efficiently and complete more searches in less time as compared to prior technologies for performing visual searches.

Figure 3:
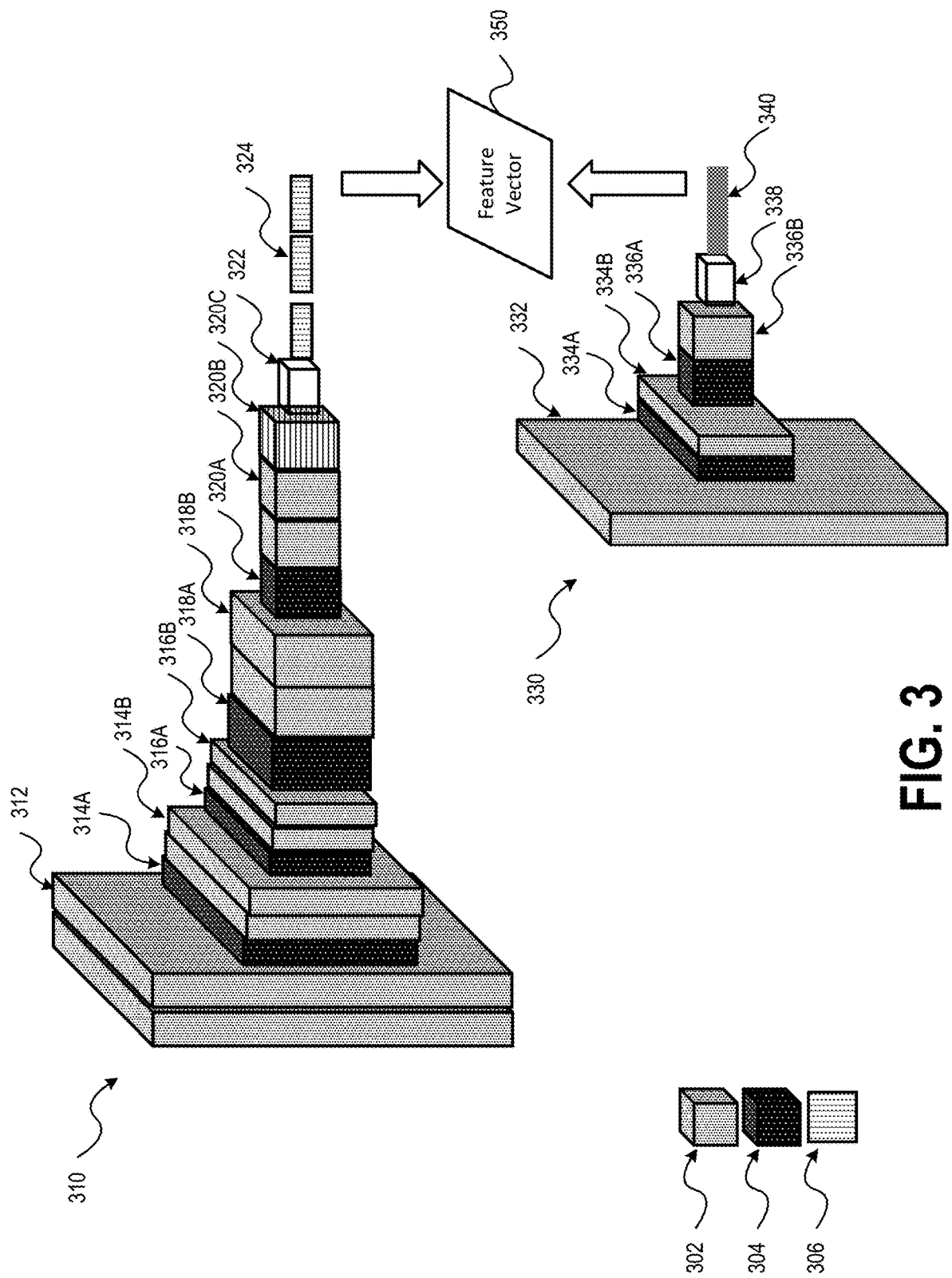
FIG. 3 is a diagram illustrating aspects of utilizing deep learning techniques for visual searching in accordance with aspects of the present disclosure.

As briefly described above with reference to FIG. 2, the visual search engine 120 may include a plurality of kernels configured to generate features sets from one or more input images. The feature sets generated by each of the plurality of kernels may apply deep learning techniques to the input image(s) to derive the feature sets. Exemplary aspects of applying deep learning techniques to input images to derive feature sets according to aspects of the present disclosure are illustrated in FIG. 3, which shows a diagram illustrating aspects of utilizing deep learning techniques for visual searching in accordance with aspects of the present disclosure. The deep learning techniques utilized by kernels of a visual search engine (e.g., the visual search engines 120, 138, 170, 180 of FIG. 1) may leverage convolutional neural networks to derive high level features and low level features from images. The high level features and low level features may be extracted from the images simultaneously using a combination of deep and shallow networks, illustrated in FIG. 3 as a deep network 310 and a shallow network 330. As used herein, the terms "deep networks" and "shallow networks" have been used to provide a relative comparison of different models utilized to perform aspects of a visual search in accordance with the present disclosure. For example, deep network models have a higher number of hidden layers and shallow network models have a lesser number of hidden layers. Thus, it should be understood that deep and shallow networks are not limited to a particular or minimum number of layers—instead, the only requirement is that the deep networks have a higher number of hidden layers as compared to the shallow networks.

In FIG. 3, the deep network 310 may capture a first set of features associated with one or more images and the shallow network 330 may capture a second set of features associated with the one or more images. The first set of features may include high level features while second set of features may include low level features derived from the source image. As used herein, high level features may include categorical features derived from images by the deep network 310, where the categorical features relate to categories of items depicted within the image content, and low level features may include characteristics of the items depicted within the image content. To illustrate, suppose that the source image depicted a wristwatch for men with a golden colored dial. The high level features may correspond to the wristwatch (e.g., a category of items), while the low level features may correspond to specific attributes or characteristics of the wristwatch depicted in the source image, such as watch for men and golden colored dial.

In the exemplary implementation shown in FIG. 3, the deep network 310 may be a convolutional neural network having 2 layers 312, 1 layer 314A, 2 layers 314B, 1 layer 316A, 2 layers 316B, one layer 318A, 2 layers 318B, 1 layer 320A, 2 layers 320B, and 1 layer 320C, an Adam optimizer comprising layer 322, and 3 layers 324. The shallow network 330 may include 1 layer 332, 1 layer 334A, 1 layer 334B, 1 layer 336A, 1 layer 336B, and a stochastic gradient descent plus momentum (SGD+momentum) optimizer that includes layer 338, and 1 layer 340.

The layers 312 may have dimensions of 224×224×64, the layers 314A and 314B may have dimensions of 112×112× 128, the layers 316A and 316B may have dimensions of 56×56×256, the layers 318A and 318B may have dimensions of 28×28×512, the layers 320A, 320B, and 320C may have dimensions of 14×14×512, the layer 322 of the Adam optimizer may have dimensions of 7×7×512 and the layers 324 of the Adam optimizer may have dimensions of 1×1× 4096. The Adam optimizer (performance friendly) is used for processing by the deep network 310. The layers of the deep network 310 may form a fully connected convolutional network configured to generate the first set of details or features based on one or more images. For example, the deep network of the kernel 220 of FIG. 2 may be configured to derive high level features from the original image 202 of FIG. 2, the deep network kernel 230 of FIG. 2 may be configured to derive high level features from the first derived images 212 of FIG. 2, and the deep network of the kernel 240 of FIG. 2 may be configured to derive high level features from the second derived images 214 of FIG. 2. It is noted that the particular numbers of layers and the dimensions of each of the different layers have been described for purposes of illustration, rather than by way of limitation and that deep networks according to aspects of the present disclosure may be implemented using more layers or less layers and layers having different dimensions than those described above in some implementations.

In a non-limiting exemplary implementation, the layer 332 may have dimensions of 224×224×64, the layers 334A and 334B may have dimensions of 56×56×256, the layers 336A and 336B may have dimensions of 14×14×512, the layer 338 of the SGD+momentum optimizer may have dimensions of 7×7×512, and the layer 340 of the SGD+ momentum optimizer may have dimensions of 1×1×4096. The SGD+momentum optimizer may increase accuracy by smoothing features derived by the layers of the shallow network 330, which may increase the accuracy of the accuracy of the visual search. The layers of the shallow network 330 may form a shallowly connected convolutional layer configured to generate the second set of details based on details the source image. It is noted that the particular numbers of layers and the dimensions of each of the different layers have been described for purposes of illustration, rather than by way of limitation and that shallow networks according to aspects of the present disclosure may be implemented using more layers or less layers and layers having different dimensions than those described above in some implementations.

In an aspect, the deep network 310 and the shallow network 330 may include one or more different types of layers, as shown in FIG. 3 by layer types 302, 304, 306. Layer type 302 may be a convolution plus rectified linear unit (convolution+ReLU) layer type; layer type 304 may be a Maxpool layer type; and layer type 306 may be a fully nected+ReLU layer type. The layer type 304 may be configured to down-sample or reduce the dimensionality of the image(s) by a factor of 2. As illustrated in FIG. 3, layers 314A, 316A, 318A, and 320A may be of the layer type 304 (e.g., a Maxpool layer type), and may reduce the dimensionality of the images. For example, layers 312 have dimensions of 224×224×64 and the Maxpool layer 314A may reduce the dimensionality of the image(s) output by the layers 312 to 112×112×128. Similar dimensionality transformations may be performed by the Maxpool layers 316A, 318A, and 320A. It is noted that the layers 334A and 336A of the shallow network 330 are also of the layer type 304 and may perform dimensionality transformations similar to those described above with reference to the layers 314A, 316A, 318A, and 320A. The layers 324 of the deep network 310 and the layer 340 of the shallow network 330 may be of the layer type 306 and outputs of the layers 324, 340 may produce a feature vector 350 derived from the image(s) processed by the respective kernels of the visual search engine. The outputs of the deep network 310 and the shallow network 330 may produce a feature vector 350.

Referring back to FIG. 1, the visual search techniques utilized by the system 100 may be applied to a wide range of use cases. For example, a user may be viewing a movie or television show on the user device 130 (or another device, such as a television) and may see an item of interest, such as an article of clothing, a device or gadget, a building, an appliance, a piece of jewelry, etc. The user may capture a picture of the object of interest using the user device 130 and then provide the image as an input to a visual search engine (e.g., the visual search engine 138 of the user device 130 or one of the other visual search engines illustrated in FIG. 1 that is accessible to the user device 130 via the one or more networks 150. The visual search engine may then perform a visual search based on the image captured by the user and return search results that include images of the item depicted in the query image. In some aspects, the search results may also include links to websites or other Internet accessible resources where the user may view the search results, such as links to e-commerce websites where the item depicted in the query image may be purchased by the user. Such capabilities may also be utilized to search an e-commerce site for products that are similar to a selected product. For example, a user may find an article of clothing that the user likes on an e-commerce website and may desire to find more similar articles of clothing. The website may include a button or other interactive element(s) (e.g., check boxes, radio buttons, etc.) that the user may activate to initiate a visual search to identify other articles of clothing that are similar to the article of clothing depicted in the query image. It is noted that the visual searching techniques of embodiments may be applied to non-ecommerce use cases as well. For example, an electronics manufacturer may use the visual searching capabilities to inspect electronic components to identify defects, such as misplaced components or missing components on a motherboard. It is noted that the exemplary use cases described herein have been provided for purposes of illustration, rather than by way of limitation and that the visual search techniques described herein may be readily applied to additional use cases and scenarios where visual searches may be used.

As shown above, the visual searching techniques described herein provide improvements to visual searching systems, such as the system 100. Utilizing fractals to organize images within a dataset may enable a visual search to be completed over a smaller search space (e.g., a smaller number of images) as compared to previous visual search techniques. This capability allows the search to be completed more quickly and with fewer computational resources while still providing a high level of accuracy, thereby overcoming many of the problems associated with existing visual searching techniques, which require a tradeoff between computational requirements and accuracy (e.g., more accuracy requires more computation resources and less computational resources decreases the accuracy of the search results). Additionally, the deep learning techniques utilized by the kernels of embodiments enable features of a set of images to be identified that may be used to achieve search results with greater than 90% accuracy.

Figure 4:
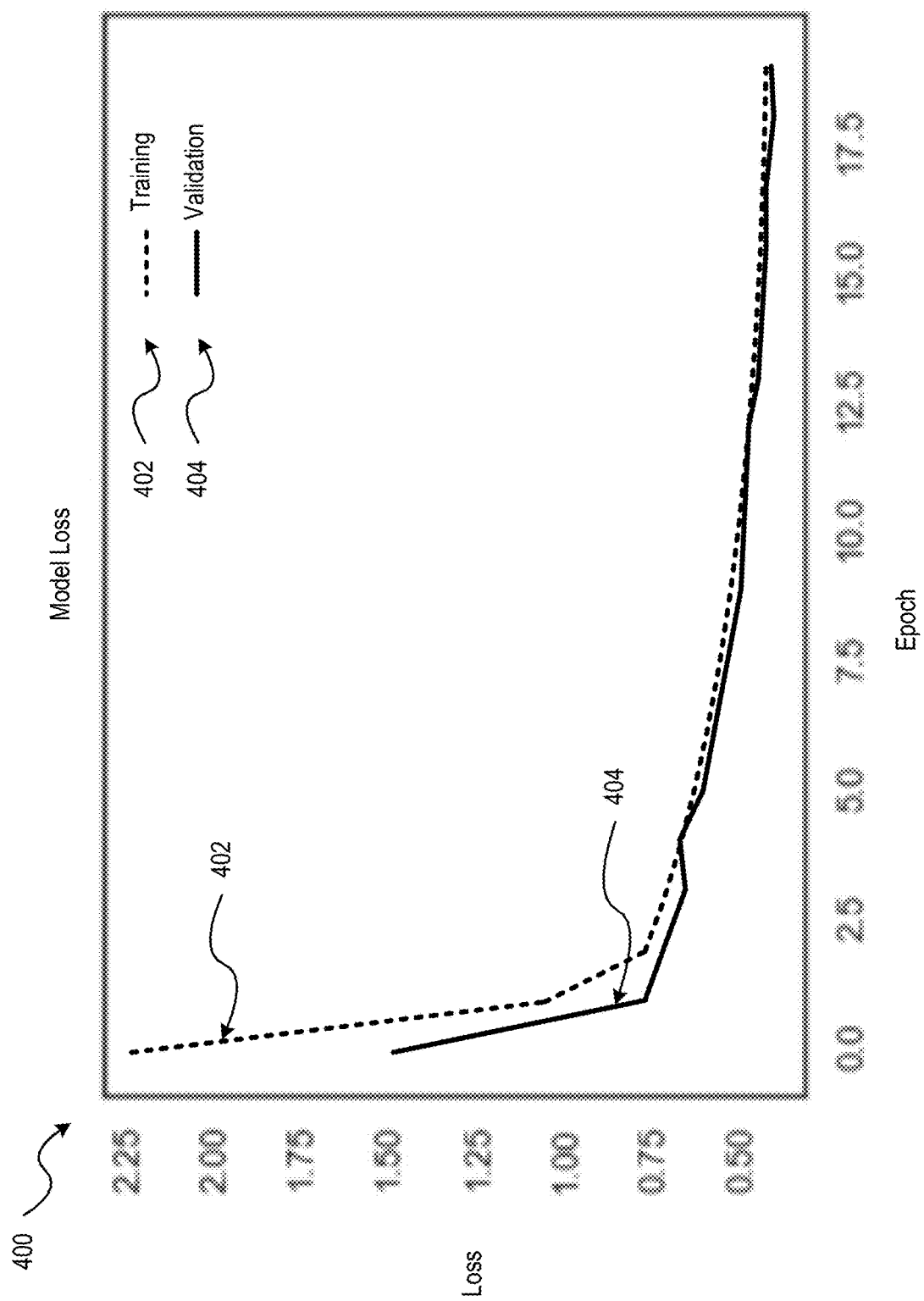
FIG. 4 is a graph illustrating aspects of training and validation deep learning models for visual searching in accordance with aspects of the present disclosure.

Referring to FIG. 4, a graph illustrating aspects of training and validation deep learning models for visual searching in accordance with aspects of the present disclosure is shown as a graph 400. The graph 400 includes a line 402 and a line 404 representing performance of the model used to conduct visual searching. More specifically, the graph 400 illustrates performance of the. As can be seen in the graph 400, the loss was significantly reduced for both the training and the validation phases of the model and closely tracked each other after about 5 epochs (e.g., 5 passes through the training or validation data). This demonstrates that the loss function of Equation 1 provides a model that performs well with respect to identifying search results that are close to the search image (e.g., the original image 202 of FIG. 2, the query images 502, 602 of FIGS. 5 and 6, respectively, etc.).

Figure 7:
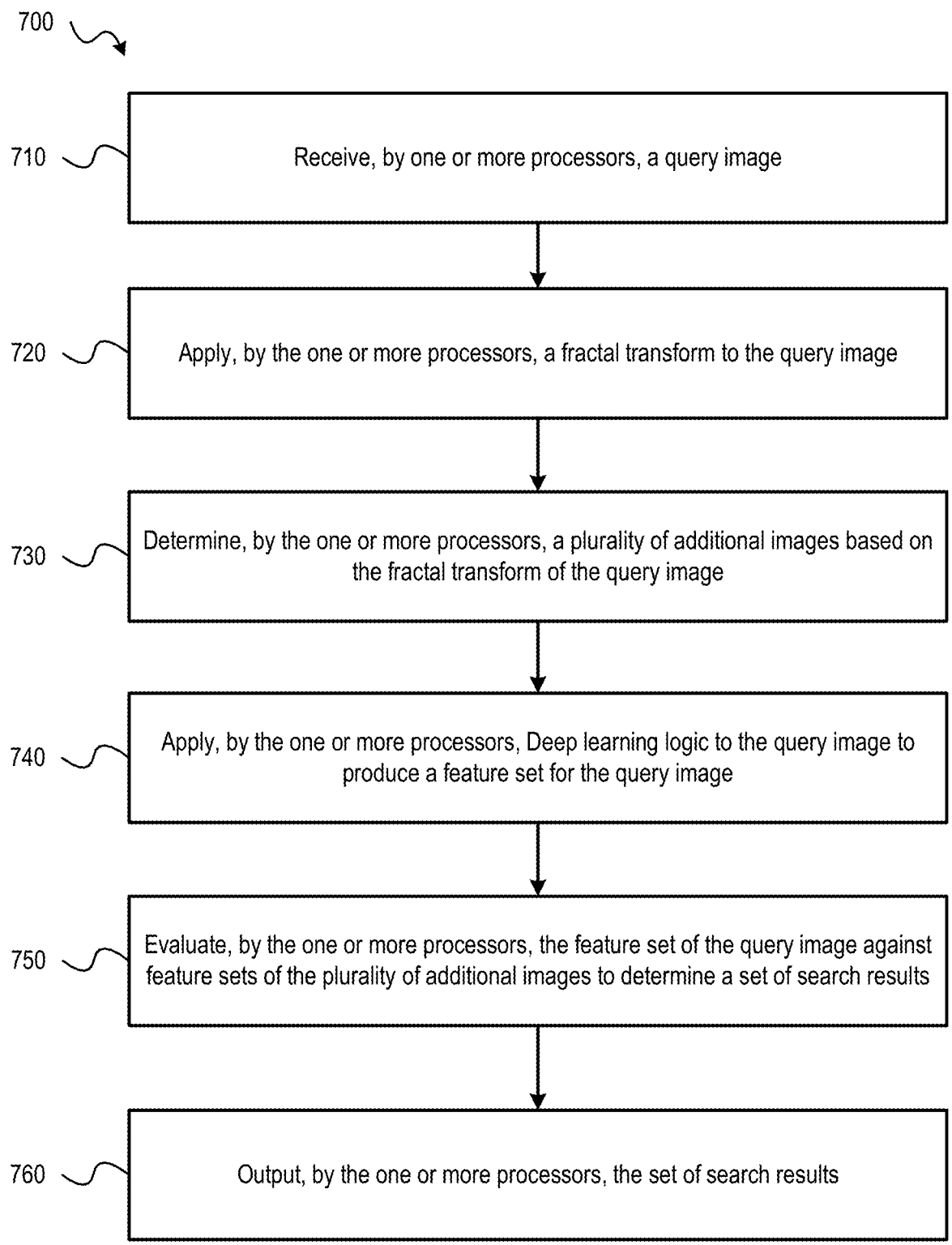
FIG. 7 is a flow diagram illustrating an exemplary method for performing a visual search in accordance with embodiments of the present disclosure.

Referring to FIG. 7, a flow diagram illustrating an exemplary method for performing a visual search in accordance with embodiments of the present disclosure is shown as a method 700. In an aspect, the method 700 may be performed by a visual search engine, such as any of the visual search engines 120, 138, 170, 180 of FIG. 1. Steps of the method 700 may be stored as instructions (e.g., the instructions 116 of FIG. 1) that, when executed by one or more processors (e.g., the one or more processors 112 of FIG. 1), cause the one or more processors to perform the steps of the method 700.

At step 710, the method 700 includes receiving, by one or more processors, a query image. As described above with reference to FIG. 1, the query image may be selected by a user (e.g., via a website displayed via a browser application, etc.). In an aspect, the query image may be the original image 202 of FIG. 2. The method 700 includes, at step 720, applying, by the one or more processors, a fractal transform to the query image and, at step 730, determining, by the one or more processors, a plurality of additional images based on the fractal transform. As described above, a dataset of images may store the plurality of images and the plurality of images may be indexed or logically associated or grouped based on fractal transforms applied to the plurality of images. Utilizing fractals to associate or group images depicting similar content together in the dataset may enable images relevant to the query image to be identified more quickly without utilizing metadata or other text, numeric, or other alphanumeric techniques.

At step 740, the method 700 includes applying, by the one or more processors, deep learning logic to the query image to produce a feature set for the query image. As explained above with respect to FIGS. 1-3, the feature set may include information associated with features of the query image. For example, the deep learning logic may be provided by one or more kernels (e.g., the kernels 220, 230, 240 of FIG. 2), where each of the one or more kernels utilizes a deep and shallow convolutional neural network to identify high level features and low level features of an image, such as the query image. The deep and shallow networks may produce feature sets (e.g., the feature vectors of FIGS. 2-3), which may be used to identify images that should be returned as search results.

At step 750, the method 700 includes evaluating, by the one or more processors, the feature set of the query image against feature sets of the plurality of additional images to determine a set of search results, as described above. In an aspect, the evaluating may include retrieving feature sets associated with the images included in the immediate search space from a memory (e.g., because the images included in the dataset may be stored based on a fractal map or index and in association with derived features sets for each image). It is noted that the search results may include images that are exact matches or very similar to the query images as well as images that differ from the query image but share some feature similarities (e.g., due to the use of both similar and dissimilar images when generating the image feature sets. At step 760, the method 700 includes outputting, by the one or more processors, the set of search results. In an aspect, the search results may be output to a web browser executing on a user device (e.g., the user device 130 of FIG. 1).

Figure 8:
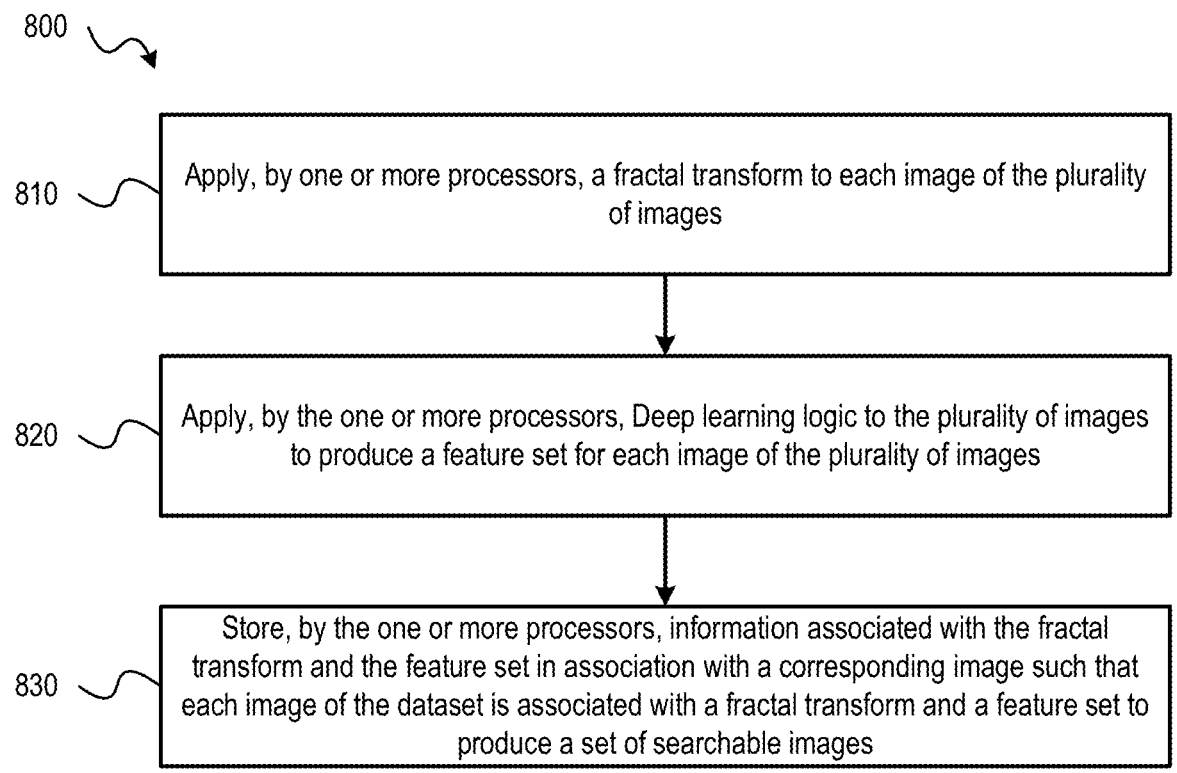
FIG. 8 is a flow diagram illustrating an exemplary method for training a visual search engine in accordance with embodiments of the present disclosure.

Referring to FIG. 8, a flow diagram illustrating an exemplary method for training a visual search engine in accordance with embodiments of the present disclosure is shown as a method 800. In an aspect, the method 800 may be performed by a visual search engine, such as any of the visual search engines 120, 138, 170, 180 of FIG. 1. Steps of the method 800 may be stored as instructions (e.g., the instructions 116 of FIG. 1) that, when executed by one or more processors (e.g., the one or more processors 112 of FIG. 1), cause the one or more processors to perform the steps of the method 800. In aspects, visual search engines trained using the method 800 may be used to perform visual searches in accordance with the method 700 and other concepts disclosed herein.

At step 810, the method 800 includes applying, by one or more processors, a fractal transform to each image of a plurality of images. In an aspect, the plurality of images may be part of a dataset (e.g., the dataset 168 of FIG. 1) that is accessible to the one or more processors. At step 820, the method 800 includes applying, by the one or more processors, deep learning logic to the plurality of images to produce a feature set for each image of the plurality of images. In an aspect, the feature set for each image of the plurality of images includes information associated with features of the image, such as the high level and low level features described above. In an aspect, the feature sets may be generated using a plurality of kernels, such as the kernels 220, 230, 240 of FIG. 2, as described above. At step 830, the method 800 includes storing, by the one or more processors, information associated with the fractal transform and the feature set in association with a corresponding image such that each image of the dataset is associated with a fractal transform and a feature set to produce a set of searchable images. The storing of the information associated with the fractal transform and the feature set in association with a corresponding image may produce a searchable dataset that includes a plurality of images, where each searchable image is associated with a feature set and an index or fractal map that may be used to identify an immediate search space upon receiving a query image, as described above.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-8) may comprise processors, electronics devices, hardware devices, electronics components, logical circuits, memories, software codes, firmware codes, etc., or any combination thereof. In addition, features discussed herein relating to FIGS. 1-8 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-3 and 7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for performing a visual search based on a query image, the method comprising:
   receiving, by one or more processors, the query image;
   applying, by the one or more processors, a fractal transform to the query image;
   determining, by the one or more processors, an immediate search space based on the fractal transform of the query image, wherein the immediate search space corresponds to a subset of a plurality of images stored in a dataset;
   applying, by the one or more processors, deep learning logic to the query image to produce a feature set for the query image,
      wherein the feature set includes information associated with features of the query image;
   evaluating, by the one or more processors, the feature set of the query image against feature sets of the subset of the plurality of images included in the immediate search space to determine a set of search results,
      wherein the set of search results comprises one or more images from the subset of the plurality of images having features similar to the query image;
   retrieving the features sets of the subset of the plurality of images included in the immediate search space from a memory based on the fractal transform of the query image,
      wherein the feature set of the query image is determined using one or more kernels of a visual search engine, and
      wherein a first portion of the feature set of the query image is obtained from the query image, a second portion of the feature set is obtained from a first derived set of images during training of the visual search engine, and a third portion of the feature set is obtained from a second derived set of images during training of the visual search engine; and
   outputting, by the one or more processors, the set of search results.

2. The method of claim 1, wherein the deep learning logic comprises a first convolutional neural network and a second convolutional neural network,
   wherein the first convolutional neural network is configured to identify high level features of an image,
   wherein the second convolutional neural network is configured to identify low level features of the image,
   wherein the high level features comprise categorical features of content of the image and the low level features comprise characteristics of the content of the image, and
   wherein the high level features and low level features are included in the feature set.

3. The method of claim 2, wherein the high level features and the low level features are identified simultaneously.

4. The method of claim 1, wherein the set of search results are determined using a K-nearest neighbors algorithm.

5. The method of claim 1, wherein the fractal transform is performed using a partitioned iterative function system.

6. The method of claim 5, wherein a loss function is configured to receive the feature set as an input and output the set of search results.

7. A non-transitory computer-readable storage medium storing instructions that, when executed by one or more processors, cause the one or more processors to perform operations to conduct a visual search based on a query image, the operations comprising:
receiving the query image;
applying a fractal transform to the query image;
determining an immediate search space based on the fractal transform of the query image, wherein the immediate search space corresponds to a subset of a plurality of images stored in a dataset;
applying deep learning logic to the query image to produce a feature set for the query image,
wherein the feature set includes information associated with features of the query image;
evaluating the feature set of the query image against feature sets of the subset of the plurality of images included in the immediate search space to determine a set of search results,
wherein the set of search results comprises one or more images from the subset of the plurality of images having features similar to the query image;
retrieving the features sets of the subset of the plurality of images included in the immediate search space from a memory based on the fractal transform of the query image,
wherein the feature set of the query image is determined using one or more kernels of a visual search engine, and
wherein a first portion of the feature set of the query image is obtained from the query image, a second portion of the feature set is obtained from a first derived set of images during training of the visual search engine, and a third portion of the feature set is obtained from a second derived set of images during training of the visual search engine; and
outputting the set of search results.

8. The non-transitory computer-readable storage medium of claim 7, wherein the deep learning logic comprises a first convolutional neural network and a second convolutional neural network,
wherein the first convolutional neural network is configured to identify high level features of an image,
wherein the second convolutional neural network is configured to identify low level features of the image,
wherein the high level features and the low level features are included in the feature set, and
wherein the high level features and the low level features are identified simultaneously.

9. The non-transitory computer-readable storage medium of claim 8, wherein the first convolutional network is a deep network and the second convolutional network is a shallow network, and wherein the deep network is configured to identify the high level features and the shallow network is configured to identify the low level features.

10. The non-transitory computer-readable storage medium of claim 7, the operations further comprising training a visual search engine, wherein the training comprises:
generating an image triplet based on a source image and additional images,
wherein the image triplet comprises the source image, a first derived set of images, and a second derived set of images,
wherein the first derived set of images are selected from the additional images based on a clustering algorithm, and
wherein the second derived set of images are selected from the additional images based on fractal sampling.

11. The non-transitory computer-readable storage medium of claim 7, wherein the deep learning logic comprises a loss function configured to receive the feature set as an input and output the set of search results.

12. A system comprising:
a memory;
one or more processors communicatively coupled to the memory;
a dataset accessible to the one or more processors, the dataset comprising a plurality of images;
a visual search engine executable by one or more processors, the visual search engine configured to:
apply a fractal transform to each image of the plurality of images;
apply deep learning logic to the plurality of images to produce a feature set for each image of the plurality of images,
wherein the feature set for each image of the plurality of images includes information associated with features of the image; and
store information associated with the fractal transform and the feature set in associated with a corresponding image such that each image of the dataset is associated with a fractal transform and a feature set to produce a set of searchable images;
determine, in response to receiving a query image, an immediate search space corresponding to a subset of the plurality of images based on the stored information and the fractal transform of the query image;
retrieving the features sets of the subset of the plurality of images included in the immediate search space from a memory based on the fractal transform of the query image,
wherein the feature set of the query image is determined using one or more kernels of the visual search engine, and
wherein a first portion of the feature set of the query image is obtained from the query image, a second portion of the feature set is obtained from a first derived set of images during training of the visual search engine, and a third portion of the feature set is obtained from a second derived set of images during training of the visual search engine; and
outputting the set of search results.

13. The system of claim 12, wherein the deep learning logic comprises a first convolutional neural network and a second convolutional neural network,
the first convolutional neural network is configured to identify high level features of an image and the second convolutional neural network is configured to identify low level features of the image,
wherein the high level features and the low level features are included in the feature set and are identified simultaneously.

14. The system of claim 12, wherein the visual search engine is configured to:
generate an image triplet based on each image of the plurality of images, wherein the image triplet comprises a source image corresponding to a selected image of the plurality of images, a first derived set of images, and a second derived set of images, wherein the first derived set of images is selected from the plurality of images based on a clustering algorithm and the second derived set of images is selected from the plurality of images based on fractal sampling.

15. The system of claim 12, wherein the plurality of images are logically grouped in the dataset into different categories according to a fractal-based index.

16. The system of claim 12, wherein the visual search engine is configured to:
- receive the query image;
- generate the fractal transform of the query image;
- apply deep learning logic to the query image to produce a feature set for the query image;
- compare the feature set for the query image to stored feature sets corresponding to images included in the immediate search space to identify a set of search results; and
- output the set of search.

* * * * *